| United States Patent [19] | [11] Patent Number: 4,908,419 |
| Holub et al. | [45] Date of Patent: Mar. 13, 1990 |

[54] POLYETHERIMIDE-POLYARYLATE, BLENDS

[75] Inventors: Fred F. Holub, Schenectady, N.Y.; William R. Schlich, Pittsfield, Mass.

[73] Assignee: General Electric Company, Pittsfield, Mass.

[21] Appl. No.: 344,012

[22] Filed: Jan. 29, 1982

[51] Int. Cl.[4] .................... C08L 67/02; C08L 79/08
[52] U.S. Cl. ......................... 525/425; 524/538
[58] Field of Search ................. 525/425, 433

[56] References Cited

U.S. PATENT DOCUMENTS

| 4,052,481 | 10/1977 | Asahara | 525/425 |
| 4,141,927 | 2/1979 | White | 525/432 |
| 4,171,330 | 10/1979 | Kyo | 525/425 |
| 4,250,279 | 2/1981 | Robeson | 525/425 |
| 4,309,518 | 1/1986 | Holbeck | 525/425 |

FOREIGN PATENT DOCUMENTS 8000349  3/1980  PCT Int'l Appl. ............ 525/425

*Primary Examiner*—Patricia Short
*Attorney, Agent, or Firm*—Bernard, Rothwell & Brown

[57] ABSTRACT

Disclosed are blends of (a) a polyetherimide and (b) a polyarylate, an aromatic polyester which is derived from a dihydric phenol and a dicarboxylic acid. These blends have improved flexural strength and flexural modulus over the polyarylate component alone and have a higher impact strength than that associated with the polyetherimide component of the blends. In addition, the blends exhibit improved molding performance characteristics as evidenced by a lower molding pressure being required than that necessary for either component of the blend when molded alone.

8 Claims, No Drawings

POLYETHERIMIDE-POLYARYLATE, BLENDS

This invention relates to a class of polyetherimide-polyarylate blends. These blends have improved flexural strength and flexural modulus over the polyarylate component alone and have a higher impact strength than that associated with the polyetherimide component of the blends. In addition, the blends exhibit improved molding performance characteristics as evidenced by a lower molding pressure being required than that necessary for either component of the blend when molded alone.

The polyetherimide-polyarylate blends of the invention include a polyetherimide such as that of the formula:

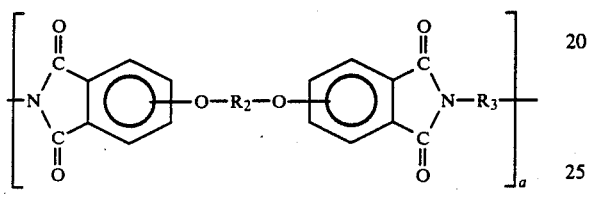

where a represents a whole number in excess of 1, e.g., 10 to 10,000 or more, the divalent bonds of the —O—R$_2$—O—radical being situated on the phthalic anhydride end groups, e.g., in the 3,3', 3,4', 4,3' or the 4,4' positions and R$_2$ is selected from (a) substituted or unsubstituted aromatic radicals such as

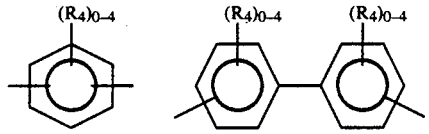

and (b) divalent organic radicals of the general formula:

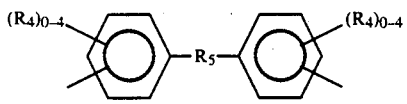

where R$_4$ is independently alkyl of one to six carbon atoms or halogen and R$_5$ is a member selected from the class consisting of divalent radicals of the formulas,

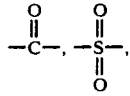

alkylene of one to six carbon atoms, cycloalkylene of four to eight carbon atoms, and alkylidene of one to six carbon atoms or cycloalkylidene of four to eight carbon atoms; and R$_3$ is a divalent organic radical selected from the class consisting of aromatic hydrocarbon radicals having from 6 to 20 carbon atoms and halogenated derivatives thereof or alkyl substituted derivatives thereof where the alkyl group contains from one to six carbon atoms, alkylene radicals and cycloalkylene radicals having from 2-20 carbon atoms, C$_{(2-8)}$ alkylene terminated polydiorganosiloxane, and divalent radicals included by the formula

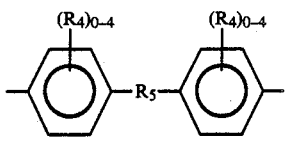

where R$_4$ and R$_5$ are as set forth above and where R$_5$ may be a direct bond.

Other polyetherimides suitable for the purposes of the present invention include the substituted polyetherimides of the formula:

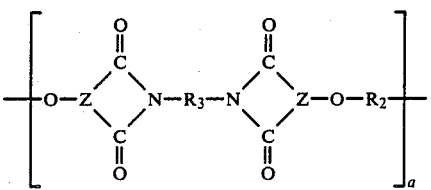

wherein

—O—Z is a member selected from

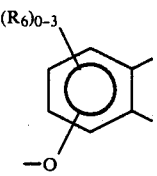

wherein R$_6$ is independently hydrogen, lower alkyl or lower alkoxy

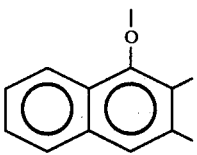

and

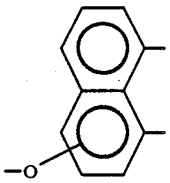

wherein the oxygen may be attached to either ring and located ortho or para to one of the bonds of the imide carbonyl groups, R$_2$ and R$_3$ and a are as previously defined.

Preferred polyetherimides for the purposes of the invention are those of the formula

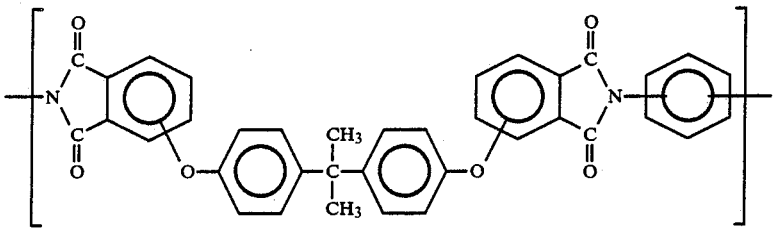

such as the polyetherimide which is the reaction product of essentially equimolar amounts of metaphenylene diamine and 2,2-bis[4-(3,4-dicarboxyphenoxy)phenyl propane.

The polyetherimide-polyarylate blends of the invention also include a polyarylate (an aromatic polyester) which is derived from one or more dihydric phenols (sometimes referred to as bisphenols or diphenols) or derivatives thereof and one or more aromatic polycarboxylic acids or derivatives thereof such as acid anhydrides, acid esters or acid halides.

Suitable dihydric phenols for producing the polyarylates include those having the general formula:

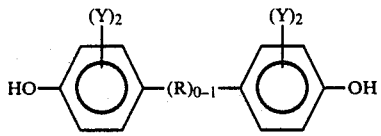

wherein Y is independently selected from alkyl groups of 1 to 6 carbon atoms, cycloalkyl groups of 6 to 12 carbon atoms, aryl groups of 6 to 20 carbon atoms, chlorine or bromine, z has a value of from 0 to 4, inclusive, and R is a divalent saturated aliphatic or aromatic hydrocarbon radical, particularly alkylene and alkylidene radicals having from 1 to 8 carbon atoms, cycloalkylene and cycloalkylidene radicals having up to and including 9 carbon atoms, and arylene radicals having from 6 to 20 carbon atoms and derivatives of such dihydric phenols.

Examples of alkylene groups for R which contain 1 to 5 carbon atoms include a methylene group, an ethylene group, a propylene group, a tetramethylene group, and the like. Examples of alkylidene groups for R which contain from 1 to 8 carbon atoms include an ethylidene group, a propylidene group, an isopropylidene group, an isobutylidene group, and the like. Examples of alkyl groups for Y containing 1 to 6 carbon atoms include a methyl group, an ethyl group, an isopropyl group, a tert-butyl group, and the like. Preferred dihydric phenols are those where z is 0 and R is an alkylidene radical of three carbon atoms.

Specific examples of dihydric phenols for forming polyarylates are 4,4'-dihydroxydiphenyl ether, bis(4-hydroxy-2-methylphenyl) ether, bis(4-hydroxy-3-chlorophenyl) ether, bis(4-hydroxyphenyl) sulfide, bis(4-hydroxyphenyl)sulfone, bis(4-hydroxyphenyl)ketone, bis(4-hydroxyphenyl)methane, bis(4-hydroxy-3-methylphenyl)methane, bis(4-hydroxy-3,5-dichlorophenyl)methane, bis(4-hydroxy-3,5-dibromophenol)methane, 1,1-bis(4-hydroxyphenyl)ethane, 2,2-bis(4-hydroxyphenyl)propane, 2,2-bis(4-hydroxy-3methylphenyl) propane, 2,2-bis(4-hydroxy-3-chlorophenyl)propane, 2,2-bis(4-hydroxy-3,5-dichlorophenyl)propane, 2,2-bis(4-hydroxy-3,5-dibromophenyl)propane, and 1,1-bis(4-hydroxyphenyl)-n-butane. The diphenol 2,2-bis(4-hydroxyphenyl)propane (also known as bisphenol A) is readily available and is a preferred diphenol.

Typical examples of functional derivatives of the dihydric phenols which can be used to produce polyarylates are the alkali metal salts and diesters thereof with aliphatic monocarboxylic acids containing 1 to 3 carbon atoms. Suitable examples of aliphatic monocarboxylic acids include formic acid, acetic acid, propionic acid, and the like. Preferred functional derivatives of the dihydric phenols are the sodium salts, the potassium salts, and the diacetate thereof.

The aromatic polycarboxylic acids for producing polyarylates include dicarboxylic acids of the general formula:

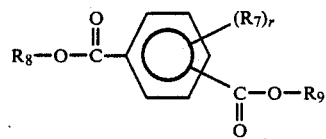

where $R_7$ is hydrogen, alkyl of one to ten carbon atoms or a halogen atom and r is 0 or an integer from 1 to 4 and $R_8$ and $R_9$ are hydrogen. Common examples of dicarboxylic acids of the above formula include tetrachlorophthalic, isophthalic, terephthalic and orthophthalic acids. Other suitable aromatic dicarboxylic acids include diphenic acid, naphthalene dicarboxylic acid and derivatives thereof.

Examples of functional derivatives of polycarboxylic acids which can be used, i.e., $R_8$ and $R_9$ are other than hydrogen, include acid halides, dialkyl esters and diaryl esters. Specific examples of phthalic acid halides include terephthaloyl dichloride, isophthaloyl dichloride, terephthaloyl dibromide and isophthaloyl dibromide. Examples of dialkyl esters include dialkyl esters of these acids containing 1 to 6 (preferably 1 to 2) carbon atoms in each alkyl moiety thereof. Preferred examples of diaryl esters of phthalic acids include diphenyl terephthalate, and diphenyl isophthalate.

A presently preferred polycarboxylic acid for producing polyarylates is a mixture of about 90 to about 10 mol % of terephthalic acid and/or its functional derivatives and about 10 to about 90 mol % of isophthalic acid and/or its functional derivatives. More preferably, a mixture of 40 to 80 mol % of terephthalic acid and/or its functional derivatives and 60 to 20 mol % of isophthalic acid and/or its functional derivatives is used. Polyarylates prepared from a diphenol as described above and a mixture of 50 to 70 mol % of terephthalic acid and/or its functional derivatives and 30 to 50 mol % of isophthalic acid and/or its functional derivatives are most preferred. The molar ratio of the diphenol(s) to the sum of the terephthalic acid units and isophthalic acid units is substantially equimolar, e.g., about 1:1.

The polyetherimides can be obtained by any of the methods well known to those skilled in the art including the reaction of any aromatic bis(ether anhydrides) of the formula

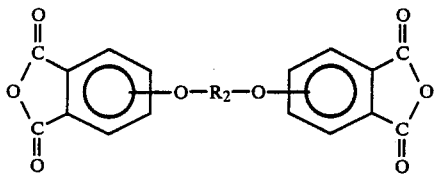

where $R_2$ is as defined hereinbefore with an organic diamine of the formula $H_2N-R_3-NH_2$ where $R_3$ is as defined hereinbefore.

Aromatic bis(ether anhydride)s of the above formula include, for example, 2,2-bis[4-(2,3-dicarboxyphenoxy)phenyl]propane dianhydride; 4,4'-bis(2,3-dicarboxyphenoxy)diphenyl ether dianhydride; 1,3-bis(2,3-dicarboxyphenoxy)benzene dianhydride; 4,4'-bis(2,3-dicarboxyphenoxy)diphenyl sulfide dianhydride; 1,4-bis(2,3-dicarboxyphenoxy)benzene dianhydride; 4,4'-bis(2,3-dicarboxyphenoxy)benzophenone dianhydride; 4,4'-bis(2,3-dicarboxyphenoxy)diphenyl sulfone dianhydride; etc., 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 1,3-bis(3,4-dicarboxyphenoxy)benzene dianhddride; 1,4-bis(3,4-dicarboxyphenoxy)benzene dianhydride; 4,4'-bis(3,4-dicarboxyphenoxy)benzophenone dianhydride; 4-(2,3-dicarboxyphenoxy)-4'(3,4-dicarboxyphenoxy)diphenyl-2,2-propane dianhydride; etc. and mixtures of such dianhydrides.

In addition, aromatic bis(ether anhydride)s also included by the above formula are shown by Koton, M.M.; Florinski, F.S.; Bessonov, M.I.; Rudakov, A.P. (Institute of Heteroorganic Compounds, Academy of Sciences, U.S.S.R.), U.S.S.R. 257,010, Nov. 11, 1969, Appl. May 3, 1967. In addition, dianhydrides are shown by M.M. Koton, F.S. Florinski, Zh Org. Khin, 4(5), 774 (1968).

Organic diamines of the above formula include, for example, m-phenylenediamine, p-phenylenediamine, 4,4'-diamihodiphenylpropane, 4,4'-diaminodiphenylmethane, benzidine, 4,4'-diaminodiphenyl sulfide, 4,4'-diaminodiphenyl sulfone, 4,4'-diaminodiphenyl ether, 1,5-diaminonaphthalene, 3,3'-dimethylbenzidine, 3,3'-dimethoxybenzidine, 2,4-bis(β-amino-t-butyl)toluene, bis(p-β-amino-tbutylphenyl)ether, bis(p-β-methyl-o-aminopentyl)benzene, 1,3-diamino-4-isopropylbenzene, 1,2-bis(3-aminopropoxy)ethane, m-xylylenediamine, p-xylylenediamine, 2,4-diaminotoluene, 2,6-diaminotoluene, bis(4-aminocyclohexyl)methane, 3-methylheptamethylenediamine, 4,4-dimethylheptamethylenediamine, 2,11-dodecanediamine, 2,2-dimethylpropylenediamine, octamethylenediamine, 3-methoxyhexamethylenediamine, 2,5-dimethylhexamethylenediamine, 2,5-dimethylheptamethylenediamine, 3-methylheptamethylenediamine, 5-methylnonamethylenediamine, 1,4-cyclohexanediamine, 1,12-octadecanediamine, bis(3-aminopropyl)sulfide, N-methyl-bis(3-aminopropyl)amine, hexamethylenediamine, heptamethylenediamine, nonamethylenediamine, decamethylenediamine, bis(3-aminopropyl)tetramethyldisiloxane, bis(4-aminobutyl)tetramethyldisiloxa, and the like, and mixtures of such diamines.

In general, the reactions can be advantageously carried out employing well-known solvents, e.g., o-dichlorobenzene, m-cresol/toluene, etc. in which to effect interaction between the dianhydrides and the diamines, at temperatures of from about 100 to about 250° C. Alternatively, the polyetherimides can be prepared by melt polymerization of any of the aforementioned dianhydrides with any of the aforementioned diamino compounds while heating the mixture of the ingredients at elevated temperatures with concurrent intermixing. Generally, melt polymerization temperatures between about 200° to 400° C. and preferably 230° to 300° C. can be employed. Any order of addition of chain stoppers ordinarily employed in melt polymerization can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides, however, in certain instances, a slight molar excess (about 1 to 5 mol percent) of diamine can be employed resulting in the production of polyetherimides having terminal amine groups. Generally, useful polyetherimides have an intrinsic viscosity [η] greater than 0.2 deciliters per gram, preferably 0.35 to 0.60, or 0.7 deciliters per gram or even higher when measured in m-cresol at 25° C.

Included among the many methods of making the polyetherimides are those disclosed in U.S. Pat. Nos. Heath et al. 3,847,867, Williams 3,847,869, Takekoshi et al. 3,850,885, White 3,852,242 and 3,855,17. These disclosures are incorporated herein in their entirety by reference for the purpose of teaching, by way of illustration, general and specific methods for preparing polyetherimides suitable for the blends of this invention.

The polyetherimides may also be prepared by the reaction of a bis(nitrophthalimide) and an alkali metal salt of an organic compound, a dihydric phenol and an alkali phenoxide, or the reaction of an aryloxy-substituted bisphthalimide, as disclosed in U.S. Patents Nos. 3,887,588 to Cook et al.; 4,017,511 to Williams and 4,024,110 to Takekoshi, incorporated herein by reference.

The polyarylates used in the blends of the subject invention can be made by a variety of methods. For example, an interfacial polycondensation can be used in which an aqueous alkaline solution (a pH above about 7 to about 13) of a dihydric phenol and an aromatic dicarboxylic acid dihalide mixture dissolved in a water-immiscible organic solvent are mixed and reacted. Typical interfacial polycondensation procedures are disclosed, for example, in W.M. Eareckson, J. Polymer Sci., XL 399 (1959).

According to a typical polycondensation procedure, an aqueous alkaline solution of dihydric phenol is added to the dihalide mixture, dissolved in an organic solvent, or an organic solvent solution of the dihalide mixture is added to an aqueous alkaline solution of diphenol and the system then is polymerized. Alternatively, an aqueous alkaline solution of the dihydric phenol and a water-immiscible organic solvent solution of the dihalide mixture can be simultaneously fed into a reaction vessel. Interfacial polycondensation takes place near the interface of the aqueous phase and the organic phase. However, since the aqueous phase and the organic phase are essentially immiscible, it is necessary to mutually disperse the phases with, for example, an agitator or a mixer such as a homomixer.

The concentration of the dihalide mixture dissolved in the organic solvent is usually about 2 to about 25% by weight, preferably 3 to 15% by weight. The concentration of the dihydric phenol in the aqueous alkaline solution is also usually about 2 to about 25% by weight, preferably 3 to 15% by weight. The amounts of diphenol and the terephthaloyl dihalide mixture are such that the molar ratio between them is preferably maintained equivalent. An excess of the dihalide mixture is generally not desirable in the preparation of high molecular weight (e.g., about $1 \times 10^4$) aromatic copolyesters.

Preferred alkalis are sodium hydroxide and potassium hydroxide. The concentration of the alkali in the aqueous solution can vary considerably depending upon the reaction conditions, but usually ranges from about 0.5 to about 10% by weight. Advantageously, the quantity of the alkali is nearly equivalent to the hydroxy groups of the diphenol used or the alkali is present in a slight excess.

Hydrocarbons or halogenated hydrocarbons can be used as water-immiscible organic solvents for the dihalide mixture. Examples of suitable organic solvents are methylene dichloride, chloroform, tetrachloromethane, 1,2-dichloroethane, 1,1,2-trichloroethane, tetrachloroethane, benzene and methylbenzene. Especially preferred are those solvents which also dissolve the polyarylate produced. Methylene dichloride is the most preferred solvent.

The reaction temperature may vary considerably but it is preferably below about 40° C. Reaction temperatures of 5° to 30° C. are especially preferred.

The interfacial polymerization is usually performed at normal atmospheric pressure, and is completed in about 1 to 30 hours. A catalyst and a viscosity stabilizer are in general employed. Examples of catalysts which can be used include quaternary ammonium compounds, tertiary sulfonium compounds, quaternary phosphonium compounds, quaternary arsonium compounds, and tertiary amine compounds. Suitable viscosity stabilizers are, for example, monohydric phenols such as o-phenyl phenol, p-phenyl phenol, m-cresol, p-tert-butyl phenol, 2-phenyl-2-hydroxy-phenylpropane and $\beta$-naphthol. The amount of catalyst used ranges from about 0.01 to about 1 mol % based on the diphenol and the amount of viscosity stabilizer ranges from about 0.5 to about 5 mol % based on the diphenol.

Another useful method for forming polyarylates is by melt polymerization as disclosed, for example, in A. Conix, Ind. Eng. Chem., 51, 147 (1959), Japanese Patent Publication 15247/1963 and U.S. Pat. No. 3,395,119.

Melt polymerization can be performed, for example, by reacting an aliphatic carboxylic acid diester of the dihydric phenol, e.g., as described above, with the aromatic polycarboxylic acid at an elevated temperature under reduced pressure. Melt polymerization can also be carried out by reacting the diphenol and a mixture of a diaryl ester of the acid while heating. A typical diaryl ester is the diphenyl ester. The reaction temperature employed is in the range of about 150° to about 350° C., preferably 180° to 320° C. The reaction pressure is usually varied in the course of the reaction from atmospheric pressure at the early stage of the reaction to reduced pressure, for example, below about 0.02 mmHg, toward the end of the reaction. The melt polymerization is completed, in general, in about 2 to about 8 hours.

A number of catalysts can be used in the reaction and preferred catalysts include titanium compounds such as butyl ortho-titanate and titanium dioxide. Other catalysts such as zinc oxide, lead oxide and diantimony trioxide can also be used.

Still another method for forming polyarylates is solution polymerization in which the polyarylate is prepared by reacting the diphenol with an aromatic dicarboxylic acid dihalide and in a water-immiscible organic solvent. Useful solution polymerization procedures are disclosed, for example, in A. Conix, Ind. Eng. Chem., 51, 147 (1959), and U.S. Pat. No. 3,133,898.

In solution polymerization, the dihydric phenol and the acid dihalide are usually mixed in equimolar proportions in a water-immiscible organic solvent, and the mixture is gradually heated to high temperatures of, for example, about 220° C. Preferably, the solvent used is one which also dissolves the polyarylate formed, such as dichloroethylbenzene. Usually, the reaction is carried out in the presence of a base to neutralize the hydrogen halide, for example, hydrogen chloride, formed. Suitable examples of the bases which can be used include a tertiary amine such as trimethylamine, triethylamine, etc., and pyridine.

In accordance with the present invention, useful blends of a polyetherimide and a polyarylate are generally obtainable in all proportions of the two polymers relative to each other. By controlling the proportions of polyetherimide and polyarylate relative to each other, blends having certain predetermined properties which are improved over those of either a polyetherimide or a polyarylate alone are readily obtained. Consequently, blends comprising from about 1 to about 99%, by weight, polyetherimide and from about 99 to about 1% by weight, polyarylate are included within the scope of the invention.

In general, blends of polyetherimides and polyarylates can be tailored to provide desired chemical and/or physical characteristics by selecting appropriate proportion of blend components. Higher proportions of polyetherimide usually contribute higher mechanical properties and higher heat distortion temperatures for the blend. Higher proportions of polyarylate generally provide higher impact strength for the blend. Clarity of the blend is generally maintained regardless of the relative proportions of the blend components. Furthermore, since the blends of the invention have improved molding performance characteristics than the blend components alone as evidenced by lower molding pressures, the blends flow longer distances and can be used to mold thinner parts and parts of a more complex shape.

It is contemplated that the polyetherimide-polyarylate blends of the present invention may also include additive materials such as fillers, stabilizers, plasticizers, flexibilizers, surfactant agents, pigments, dyes, reinforcements, flame retardants and diluents in conventional amounts. It is also contemplated that the blends of the invention may include two or more polyetherimides with one or more polyarylates or two or more polyarylates in combination with one or more polyetherimides.

Methods for forming polyetherimide-polyarylate blends may vary considerably. Prior art blending techniques are generally satisfactory. A preferred method comprises blending the polymers and additives such as reinforcements in powder, granular or filamentous form, extruding the blend, and chopping the extrudate into pellets suitable for molding by means conventionally used to mold normally solid thermoplastic compositions.

The polyetherimide-polyarylate blends of the present invention have application in a wide variety of physical shapes and forms, including the use as films, molding compounds, coatings, etc. When used as films or when made into molded products, these blends, including laminated products prepared therefrom, not only possess good physical properties at room temperature but they retain their strength and excellent response to workloading at elevated temperatures for long periods of time. Films formed from the blends of this invention may be used in application where films have been used previously. Thus, the blends of the present invention can be used in automobile and aviation applications for decorative and protective purposes, and as high temperature electrical insulation for motor slot liners, transformers, dielectric capacitors, coil and cable wrappings (form wound coil insulation for motors), and for containers and container linings. The blends can also be used in laminated structures where films or solutions of the blend are applied to various heat-resistant or other type of materials such as asbestos, mica, glass fiber and the like, the sheets superimposed one upon the other, and thereafter subjecting the sheets to elevated temperatures and pressures to effect flow and cure of the resinous binder to yield cohesive laminated structures. Films made from the subject polyetherimide-polyarylate blends can also serve in printed circuit applications.

Alternatively, solutions of the blends herein described can be coated on electrical conductors such as copper, aluminum, etc. and thereafter the coated conductor can be heated at elevated temperatures to remove the solvent and provide a continuous resinous composition thereon. If desired, an additional overcoat may be applied to such insulated conductors including the use of polymeric coatings, such as polyamides, polyesters, silicones, polyvinylformal resins, epoxy resins, polyimides, polytetrafluoroethylene, etc. The use of the blends of the present invention as overcoats on other types of insulation is not precluded.

Other applications which are contemplated for these blends include their use as binders for asbestos fibers, carbon fibers, and other fibrous materials in making brake linings. In addition, molding compositions and molded articles may be formed from the polymeric blends of the invention by incorporating such fillers as asbestos, glass fibers, talc, quartz, powder, finely divided carbon, silica, and the like, into the blends prior to molding. Shaped articles may be formed under heat, or under heat and pressure, in accordance with practices well-known in the art.

The following examples illustrate specific polyetherimide-polyarylate blends in accordance with the present invention. It should be understood that the examples are given for the purpose of illustration and do not limit the invention. In the examples, all parts and percentages are by weight unless otherwise specified.

EXAMPLE I

A polyetherimide-polyarylate blend according to the invention was prepared, molded into test specimens and tested for various physical properties.

The polyetherimide was prepared from the reaction product of essentially equimolar amounts of 2,2-bis[4-(3,4-dicarboxyphenoxy) phenyl]propane and m-phenylene diamine produced at elevated temperature of about 250° to about 300° C. and under a nitrogen atmosphere. The polymer was extruded at about 300° C. to form a strand and mechanically chopped into pellets. A test specimen was injection molded from the pellets at a temperature of about 685°-700° F. During molding, the molding machine guage pressure was noted to provide a relative indication of the pressure necessary to mold the test specimen.

The polyarylate used in forming the blend was a polyarylate sold commercially under the trade name ARDEL D-100 by Union Carbide Corporation which is the reaction product of bisphenol A and a mixture of terephthalic acid chloride and isophthalic acid chloride. A test specimen for comparative purposes was injection molded from pellets of the polyarylate at a temperature of about 685°-700° F.

The blend was prepared by mixing the two polymers in a proportion of about 75 parts polyetherimide and about 25 parts polyarylate and then extruding the mixture in a Werner & Pfleiderer extruder having a temperature profile varying from about 615 to 650° F. The resulting extrudate was comminuted into pellets and the pellets injection molded at about 685° F. to 700° F. into test specimens having dimensions of about $2\frac{1}{2}'' \times \frac{1}{2}'' \times \frac{1}{8}''$, the latter dimension being the specimen thickness. Impact strengths of these specimens as well as of the specimens of polyarylate and of polyetherimide were measured according to the notched Izod test, ASTM D256, and the results are set forth in Table I. The heat distortion temperature, flexural strength, flexural modulus, and molding machine gauge pressure recorded during molding of the specimens were also measured and are given in Table I both for the pure components and for the blend.

EXAMPLE II

The procedure of Example I was repeated with the exception that about 50 parts of polyetherimide were mixed with about 50 parts of polyarylate to produce the blend according to the invention. The results of the notched Izod impact test, as well as the appearance, heat distortion temperature, flexural strength, flexural modulus and gauge molding pressure for test specimens of the blend are detailed in Table I.

EXAMPLE III

The procedure of Example I was repeated with the exception that about 25 parts of polyetherimide were blended with about 75 parts of polyarylate to produce the blend according to the invention. The results of the notched Izod impact test, as well as the appearance, heat distortion temperature, flexural strength, flexural modulus and molding pressure for test specimens of the blend are detailed in Table I.

TABLE I

| Specimen | Notched Izod (ft-lb/in) | Heat Distortion Temperature (°F. at 264 psi) | Flexural Strength (psi) | Flexural Modulus (psi) | Molding Pressure (psi at 690° F.) | Appearance |
| --- | --- | --- | --- | --- | --- | --- |
| Example I Blend | 1.5 | 378 | 22,500 | 424,000 | 1300 | clear |
| Example II Blend | 1.5 | 362 | 20,100 | 407,000 | 1600 | pearly |
| Example III Blend | 3.3 | 343 | 17,000 | 350,000 | 1500 | pearly |
| Polyetherimide | 1.0 | 390 | | | >2000 | — |
| Polyarylate | 5.2 | 342 | 14,000 | 282,000 | 1700 | — |

As is apparent from the above test results, blends according to the present invention have an improved flexural strength and flexural modulus over the polyarylate component alone and have an improved impact strength over the polyetherimide component by itself. In addition, the blends have improved molding performance characteristics over either of the components of the blend.

Substitution of other polyetherimides and/or other polyarylates for the polyetherimide and/or polyarylate of the blends of the above examples can result in the formulation of polyetherimide-polyarylate polymer blends having similar characteristics such as improved mechanical properties and molding pressure profiles and such blends are considered within the scope of the invention.

While the present invention has been described with reference to particular embodiments thereof, it will be understood that numerous modifications may be made by those skilled in the art without actually departing from the spirit and scope of the invention as defined in the appended claims.

It is claimed:

1. A molding composition comprising a blend of (a) a polyarylate derived from at least one dihydric phenol and at least one aromatic dicarboxylic acid; and (b) a polyetherimide.

2. A composition as defined in claim 1 wherein the dihydric phenol is of the formula:

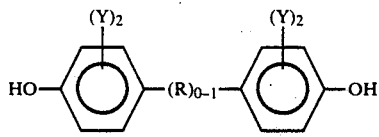

wherein Y is independently selected from alkyl groups of 1 to 4 carbon atoms, cycloalkyl groups of 6 to 12 carbon atoms, aryl groups of 6 to 20 carbon atoms, chlorine or bromine, z independently has a value from 0 to 4, inclusive, and R is a divalent saturated aliphatic or aromatic hydrocarbon radical selected from alkylene and alkylidene radicals having from 1 to 8 carbon atoms, cycloalkylene and cycloalkylidene radicals having up to and including 9 carbon atoms and arylene radicals having from 6 to 20 carbon atoms.

3. A composition as defined in claim 2 wherein each z is 0 and R is an alkylidene radical of 3 carbon atoms.

4. A composition as in claim 1 wherein the aromatic dicarboxylic acid in (a) is selected from terephthalic or isophthalic acids, or mixtures thereof.

5. A composition as defined in claim 1 wherein the polyetherimide is of the following formula:

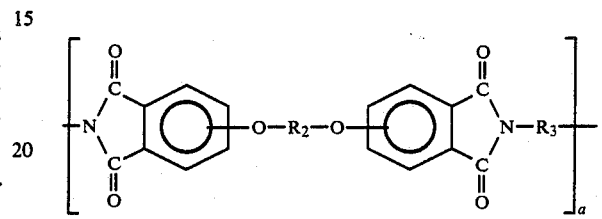

wherein a is an integer greater than 1, preferably from about 10 to about 10,000 or more, —O—$R_2$O— is attached to the 3 or 4 and 3', or 4', positions and $R_2$ is selected from (a) a substituted or unsubstituted aromatic radical such as

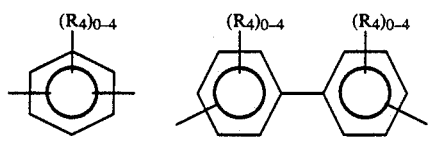

(b) a divalent radical of the formula:

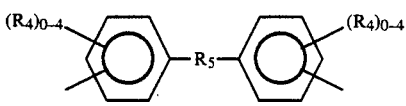

wherein $R_4$ is independently $C_1$ to $C_6$ alkyl, or halogen and $R_5$ is selected from —O—, —S—,

—$SO_2$—, —SO—, alkylene of 1 to 6 carbon atoms, cycloalkylene of 4 to 8 carbon atoms and alkylidene of 1 to 6 carbon atoms or cycloalkylidene of 4 to 8 carbon atoms; $R_3$ is selected from an aromatic hydrocarbon radical having from 6 to 20 carbon atoms and halogenated derivatives thereof or alkyl substituted derivatives thereof wherein the alkyl group contains 1 to 6 carbon atoms, alkylene and cycloalkylene radicals having from 2 to 20 carbon atoms, $C_2$-$C_8$ alkylene terminated polydiorganosiloxane and a divalent radical of the formula

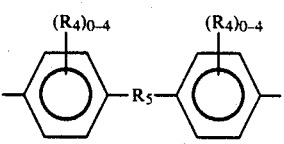

wherein R$_4$ and R$_5$ are as previously defined and wherein R$_5$ may be a direct bond.

6. A composition as defined in claim 1 wherein the polyetherimide is of the following formula:

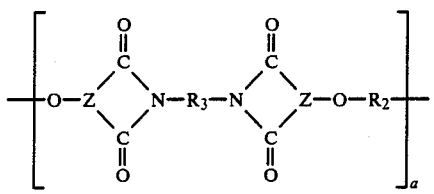

wherein

is a member selected from

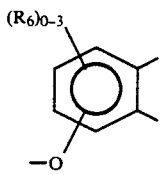

wherein R$_6$ is independently hydrogen, lower alkyl or lower alkoxy

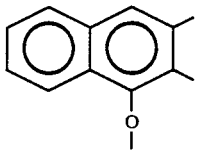

and

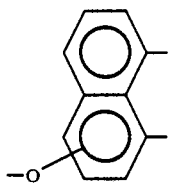

wherein the oxygen may be attached to either ring and located ortho or para to one of the bonds to the anhydride carbonyl group, a is an integer greater than 1, preferably from about 10 to about 10,000 or more, R$_2$ is selected from (a) a substituted or unsubstituted aromatic radical such as

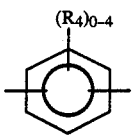 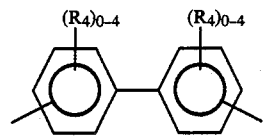

(b) a divalent radical of the formula:

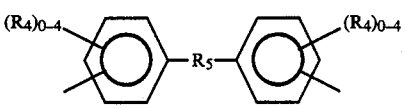

wherein R$_4$ is independently C$_1$ to C$_6$ alkyl, or halogen and R$_5$ is selected from —O—, —S—,

—SO$_2$—, —SO—, alkylene of 1 to 6 carbon atoms, cycloalkylene of 4 to 8 carbon atoms and alkylidene of 1 to 6 carbon atoms or cycloalkylidene of 4 to 8 carbon atoms; R$_3$ is selected from an aromatic hydrocarbon radical having from 6 to 20 carbon atoms and halogenated derivatives thereof or alkyl substituted derivatives thereof wherein the alkyl group contains 1 to 6 carbon atoms, alkylene and cycloalkylene radicals having from 2 to 20 carbon atoms, C$_2$-C$_8$ alkylene terminated polydiorganosiloxane and a divalent radical of the formula

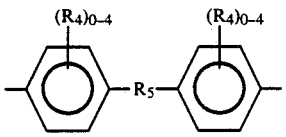

wherein R$_4$ and R$_5$ are as previously defined and wherein R$_5$ may be a direct bond.

7. A composition as in claims 1, 5, or 6 wherein the polyetherimide is of the following formula:

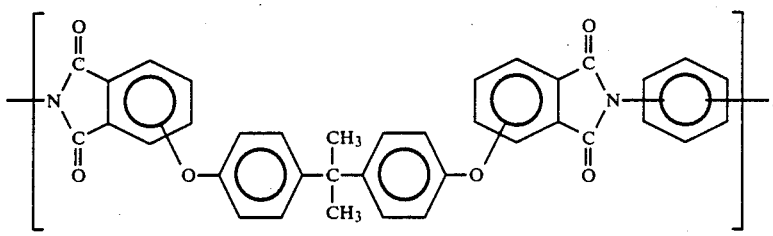

8. A composition in accordance with claim 7 further containing at least one filler.

* * * * *

UNITED STATES PATENT AND TRADEMARK OFFICE
CERTIFICATE OF CORRECTION

PATENT NO. : 4,908,419

DATED : March 13, 1990

INVENTOR(S) : Holub et al.

It is certified that error appears in the above-identified patent and that said Letters Patent is hereby corrected as shown below:

On the title page, item (54): line 1, delete the comma;
Item (56) "1/1986" should be --1/1982--

Col. 1, line 1, delete the comma;
lines 55-59 in the formula:

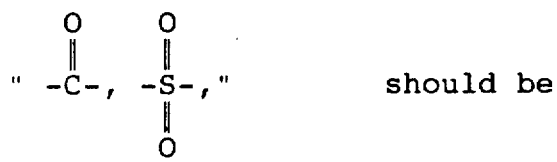   should be

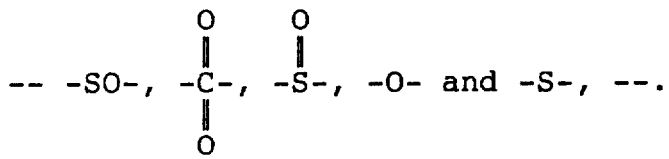

Col. 2, line 30, "-O-Z" should be -- -O-Z< --.

Col. 3, line 26, "(Y)2" (both occurrences) to --(Y)$_Z$--.

line 64, "2,2-bis(4-hydroxy-3methyl-" should be
-- 2,2-bis(4-hydroxy-3-methyl- --.

UNITED STATES PATENT AND TRADEMARK OFFICE
CERTIFICATE OF CORRECTION

PATENT NO. : 4,908,419

DATED : March 13, 1990

INVENTOR(S) : Holub et al.

It is certified that error appears in the above-identified patent and that said Letters Patent is hereby corrected as shown below:

Col. 5, line 55, "bis(p-β-amino-tbutylphenyl)ether," should be --bis(p-β-amino-t-butylphenyl)ether,--

Col. 6, line 3, bis(4-aminobutyl)tetramethyldisiloxa, should be --bis(4-aminobutyl)tetramethyldisiloxane,--;

line 35, "3,855,17" should be --3,855,178--.

Col. 7, line 24, delete the second period.

Col. 12, line 25, "15" should be -- is --;
line 26, "3'," should be -- 3' --.

Col. 11, line 46, "(Y)$_2$" (both occurrences) should be --(Y)$_z$--.

Signed and Sealed this

Seventh Day of September, 1993

*Attest:*

*Attesting Officer*

BRUCE LEHMAN

*Commissioner of Patents and Trademarks*